US005245552A

United States Patent [19]

Andersson et al.

[11] Patent Number: 5,245,552

[45] Date of Patent: Sep. 14, 1993

[54] METHOD AND APPARATUS FOR ACTIVELY REDUCING MULTIPLE-SOURCE REPETITIVE VIBRATIONS

[75] Inventors: Anders O. Andersson, Seattle; Erik L. Godo, Kirkland, both of Wash.

[73] Assignee: The Boeing Company, Seattle, Wash.

[21] Appl. No.: 608,971

[22] Filed: Oct. 31, 1990

[51] Int. Cl.⁵ ........................ G01M 7/00; G01H 17/00

[52] U.S. Cl. .................................... 364/508; 364/574; 381/71

[58] Field of Search ........... 364/507, 508, 574, 551.02, 364/581; 381/71; 73/602, 625, 645–648; 416/34

[56] References Cited

U.S. PATENT DOCUMENTS

| | | | |
|---|---|---|---|
| 4,122,303 | 10/1978 | Chaplin et al. | 179/1 |
| 4,153,815 | 5/1979 | Chaplin et al. | 179/1 |
| 4,417,098 | 11/1983 | Chaplin et al. | 381/94 |
| 4,435,751 | 3/1984 | Hori et al. | 364/574 |
| 4,449,235 | 5/1984 | Swigert | 381/71 |
| 4,473,906 | 9/1984 | Warnaka et al. | 381/71 |
| 4,477,505 | 10/1984 | Warnaka | 428/160 |
| 4,480,333 | 10/1984 | Ross | 381/71 |
| 4,489,441 | 12/1984 | Chaplin | 381/71 |
| 4,490,841 | 12/1984 | Chaplin et al. | 381/71 |
| 4,525,791 | 6/1985 | Hagiwara et al. | 364/508 |
| 4,527,282 | 7/1985 | Chaplin et al. | 381/71 |
| 4,562,589 | 12/1985 | Warnaka et al. | 381/71 |
| 4,566,118 | 1/1986 | Chaplin et al. | 381/71 |
| 4,589,133 | 5/1986 | Swinbanks | 381/71 |
| 4,596,033 | 6/1986 | Swinbanks | 381/71 |
| 4,600,863 | 7/1986 | Chaplin et al. | 318/114 |
| 4,626,730 | 12/1986 | Hubbard, Jr. | 310/326 |
| 4,654,871 | 3/1987 | Chaplin et al. | 381/72 |
| 4,669,122 | 5/1987 | Swinbanks | 381/71 |
| 4,689,821 | 8/1987 | Salikuddin et al. | 381/71 |
| 4,715,559 | 12/1987 | Fuller | 244/1 |
| 4,736,431 | 4/1988 | Allie et al. | 381/71 |
| 4,947,435 | 8/1990 | Taylor | 381/71 |

FOREIGN PATENT DOCUMENTS

| | | |
|---|---|---|
| 0252647 | 1/1988 | European Pat. Off. . |
| WO88/02912 | 4/1988 | PCT Int'l Appl. . |
| 2187063A | 8/1987 | United Kingdom . |
| 2191063A | 12/1987 | United Kingdom . |

OTHER PUBLICATIONS

Taylor, R. B., P. E. Zwicke, P. Gold and W. Miao, "Analytical Design and Evaluation of an Active Control System for Helicopter Vibration Reduction and Gust Response Alleviation", NASA, Jul. 1980.

*Primary Examiner*—Edward R. Cosimano
*Assistant Examiner*—E. Pipala
*Attorney, Agent, or Firm*—Christensen, O'Connor, Johnson & Kindness

[57] ABSTRACT

A method and apparatus for reducing multiple-source repetitive vibrations in a region or structure (12) by applying control vibrations to the region or structure via actuators (18), frequently recalculating the control vibrations based on source elements to accommodate for varying phase differences between the sources of the repetitive vibrations (14) and (16), and cyclically updating the source elements of the control vibrations is disclosed. The repetitive vibrations are sensed (20) synchronously with the repetitive vibration source chosen as the reference source and decomposed into a number of frequency components corresponding to the reference source. The control vibrations are formed of the same frequency components and applied synchronously with the reference source. Each frequency component of the control vibrations is defined by source elements, one for cancelling vibrations produced by each of the repetitive vibration sources. A first estimate of the source elements of the frequency components, defining control vibrations that will reduce the sensed vibrations, is made. The source elements of the frequency components and the phase differences between the reference source and the other repetitive vibration sources are used to calculate control signals that drive the actuators (18) that produce the control vibrations. The control signals are frequently recalculated using the instantaneous phase differences. Cyclically, the source elements of the frequency components of the control vibrations are updated to improve the reduction of the sensed vibrations. The updated source elements are used to frequently recalculate the control signals driving the actuators based upon the instantaneous phase differences between the reference source and the other repetitive vibration sources.

54 Claims, 6 Drawing Sheets

METHOD AND APPARATUS FOR ACTIVELY REDUCING MULTIPLE-SOURCE REPETITIVE VIBRATIONS

TECHNICAL AREA

This invention is directed to methods and apparatus for reducing repetitive vibrations and, more particularly, to methods and apparatus for actively reducing multiple-source repetitive vibrations.

BACKGROUND OF THE INVENTION

Various methods and apparatus have been proposed for actively reducing vibrations in a region containing a gas or liquid or in a structure of solid bodies. The concept of actively reducing vibrations consists of introducing control vibrations to combine with vibrations in a region or structure so that the resultant vibrations in the region or structure are of a lower amplitude than the vibrations in the region or structure without the control vibrations. The active reduction of audible noise in a region has been particularly pursued, e.g., the reduction of noise in an aircraft cabin generated by jet or propeller engines. Actively reducing vibrations is of considerable importance for low-frequency vibrations because of the difficulty in passively reducing low-frequency components. Passive reduction typically refers to the use of vibration absorbing or blocking materials such as sound absorbing liners in the case of noises in gases. The amount of such vibration absorbing materials needed to be effective increases considerably as the frequency of the vibration is decreased and, thus, is impractical in applications where weight and volume are constrained.

Recently, devices that reduce vibrations in a region or structure by sensing vibrations in the region or structure, decomposing the sensed vibrations into frequency components, calculating output frequency components with some frequency-domain operation, composing control vibrations from the output frequency components, and applying the control vibrations in the region or structure via actuators to reduce the sensed vibrations have been introduced. Generally referred to herein as frequency-domain vibration controllers, such a controller, for example, is disclosed in U.S. patent application Ser. No. 07/575,223, filed Aug. 30, 1990, entitled "Method and Apparatus for Actively Reducing Repetitive Vibrations" by Anders O. Andersson et al. and assigned to the assignee of the present application.

Frequency-domain vibration controllers reduce repetitive vibrations produced by one or more repetitive vibration sources by performing a frequency-domain operation on a present cycle of the sensed vibrations to determine control vibrations and introducing the control vibrations at a later cycle of the sensed vibrations. The control vibrations reduce the sensed vibrations, which consist of the repetitive vibrations introduced by the repetitive vibration sources and the control vibrations introduced by the actuators. The control vibrations can be cyclically updated to increase the amount of reduction.

Current frequency-domain vibration controllers may be used to reduce repetitive vibrations created by multiple sources of repetitive vibrations. Generally, the operation of frequency-domain vibration controllers is synchronized with one of the repetitive vibration sources, referred to herein as the reference source. The repetitive vibrations in the region or structure are sensed synchronously with the reference source, and the control vibrations are applied to the region or structure synchronously with the reference source. Generally, the sensed vibrations are decomposed into frequency components consisting of a fundamental frequency and harmonics thereof. The fundamental frequency of the decomposition is chosen to be the fundamental frequency of the reference source. A frequency-domain vibration controller operating synchronously with a reference source can effectively reduce the repetitive vibrations produced by multiple sources of repetitive vibrations if all sources of repetitive vibrations operate at exactly the same frequency. However, there are applications in which there are multiple sources of repetitive vibrations operating at slightly different frequencies. In these applications, the slight differences in the frequencies of the sources produce vibrational beats that are not reduced by the frequency-domain vibration controller.

Take, for example, the application of a frequency-domain vibration controller for reducing the noise in an aircraft cabin generated by the aircraft's jet engines. Prior art frequency-domain vibration controllers used in aircraft were operated synchronously with the rotational frequency of one of the aircraft's jet engines, i.e., the chosen reference source. However, the jet engines of an aircraft rarely operate at exactly the same rotational frequency. Therefore, each jet engine produces a repetitive vibration of a slightly different frequency. The differences in the frequencies of the repetitive vibrations produce vibrational beats that are not effectively reduced by the frequency-domain vibration controller. These vibrational beats are annoying to the passengers of the aircraft.

The present invention improves prior art frequency-domain vibration controllers such that these controllers can more effectively reduce repetitive vibrations generated by sources operating at slightly different frequencies. In essence, a frequency-domain vibration controller operating in accordance with the present invention operates synchronously with the repetitive vibration source chosen as the reference source, but frequently corrects the control vibrations based upon the instantaneous phase differences between the sources of the repetitive vibrations.

Generally, in frequency-domain vibration controllers, the control vibrations are cyclically updated to approach waveforms that optimize the reduction of the repetitive vibrations in the region or structure. In addition, some frequency-domain vibration controllers incorporate an adaptive method of updating the control vibrations. Such adaptive methods effectively optimize the reduction of the sensed vibrations whether or not changes are occurring in the repetitive vibrations, the region or structure, or the frequency-domain vibration controller. The method of the present invention can be used with such adaptive frequency-domain vibration controllers. Further, the method of the present invention is adaptive itself.

SUMMARY OF THE INVENTION

In accordance with this invention, a method and apparatus for reducing multiple-source repetitive vibrations in a region or structure by applying a plurality of control vibrations to the region or structure via actuators, frequently recalculating the control vibrations based on source elements to accommodate varying phase differences between the sources of the repetitive vibrations, and cyclically updating the source elements of the control vibrations is provided. One of the plurality of repetitive vibration sources is chosen as the reference source. The phase differences between the reference source and the other repetitive vibration sources are monitored. The repetitive vibration at each of a plurality of locations in the region or structure is sensed synchronously with the reference source. Each sensed vibration is decomposed into a number of frequency components corresponding to the frequency components of the repetitive vibrations produced by the reference source. The control vibrations are formed of the same frequency components and are applied synchronously with the reference source. Each frequency component of the control vibrations is defined by a plurality of source elements, one for controlling vibrations produced by each of the repetitive vibration sources. An estimate of the source elements of each control vibration's frequency components, defining control vibrations that will reduce the sensed vibrations, is made. The source elements of the control-vibration frequency components along with the phase differences between the reference source and the other sources are used to calculate control signals that are used to drive the actuators, which as a result produce the control vibrations. The control signals are frequently recalculated using the instantaneous phase differences between the reference source and the other sources. Cyclically, the source elements of the control vibration frequency components are updated to improve the reduction of the sensed vibrations. Each update cycle is begun by sensing, synchronously with the reference source, the vibration at each of the plurality of locations in the region or structure at which a sensor is located. Each sensed vibration is decomposed into the same frequency components as before. The frequency components with the greatest amplitude are selected for updating. For each control vibration the source elements of the selected frequency components are updated. The control signals are then frequently recalculated using the updated source elements and the instantaneous phase differences.

In accordance with further aspects of the invention, the source elements of the control vibration frequency components are adaptively updated so as to improve the accuracy of the decomposition of the frequency components into source elements, whether or not changes occur in the repetitive vibrations, the region or structure, or the apparatus used to carry out the method of the invention. The source elements are adaptively updated in the update cycle. For each control vibration, amplitude and phase updates are calculated for the frequency components selected for updating. The amplitude and phase updates are decomposed into source element updates based upon the phase differences between the reference source and the other repetitive vibration sources. The source element updates are added to the present source elements to obtain updated source elements.

The preferred form of an apparatus formed in accordance with the invention includes: a plurality of sensors, an input system, a controller, an output system, a plurality of actuators, a plurality of synchronized signal generators, and a phase differentiator. The sensors and actuators are dispersed in the region or structure. Signals produced by the sensors are applied to the input system. The input system is coupled to the controller, and the controller is coupled to the output system. The actuators are coupled to the output system. A synchronized signal generator is provided for each repetitive vibration source. Preferably, each synchronized signal generator includes a low-pass filter and a phase-locked loop. The input of the low-pass filter is coupled to the corresponding repetitive vibration source via a sensor monitoring the source, and the output of the low-pass filter is coupled to the input of the phase-locked loop. One of the repetitive vibration sources is designated as the reference source. The output of the synchronized signal generator coupled to the reference source is applied to the input system, the controller, and the output system. The output from each synchronized signal generator is coupled to the phase differentiator, and the output of the phase differentiator is applied to the controller and output system. In operation, the input system samples the analog input signals produced by the sensors to produce corresponding digital input signals. The sampling is synchronized by the synchronized signal produced by the synchronized signal generator coupled to the reference source. The input system decomposes the digital input signals into a set of frequency components. The controller selects the frequency components to be updated, calculates source element updates, and updates the source elements therewith. Using the source elements and the instantaneous phase differences produced by the phase differentiator, the output system frequently calculates amplitudes and phases for the control-vibration frequency components. The output system inverse decomposes the amplitudes and phases to form digital control signals. The output system converts the digital control signals to analog control signals and simultaneously applies the analog control signals to the inputs of the actuators. The digital-to-analog conversion is synchronized by the synchronized signal corresponding to the reference source.

As will be appreciated from the foregoing brief summary, a method and apparatus for reducing multiple-source repetitive vibrations in a region or structure by applying a plurality of control vibrations to the region or structure via actuators, frequently recalculating the control vibrations based on source elements to accommodate for the varying phase differences between the sources of the repetitive vibrations, and cyclically updating the source elements of the control vibrations is provided. The method and apparatus of the present invention can control repetitive vibrations produced by a plurality of repetitive vibration sources operating at slightly different frequencies. The differences in the frequencies of the sources are accommodated by frequently recalculating the control vibrations using the instantaneous phase differences between a reference source and the other repetitive vibration sources. The source elements used to calculate the control vibrations are cyclically updated in an adaptive manner so as to improve the reduction of the sensed vibrations whether or not changes are occurring in the repetitive vibrations, the region or structure, or the apparatus used to carry out the method of the invention.

It will be further appreciated that prior art frequency-domain vibration controllers can be modified in accordance with the present invention to obtain frequency-domain vibration controllers that can control multiple-source repetitive vibrations. Generally, prior art frequency-domain vibration controllers can only control repetitive vibrations produced by a single source or multiple sources operating at exactly the same frequency. If modified to produce a frequency-domain vibration controller in accordance with the present invention, prior art frequency-domain vibration controllers can control repetitive vibrations produced by multiple sources operating at slightly different frequencies. As in the prior art, a frequency-domain vibration controller according to the present invention operates synchronously with a single source of the repetitive vibrations. However, in accordance with the invention, the phase and frequency of each repetitive vibration source is monitored and the control vibrations are frequently recalculated to accommodate the varying phase differences between the repetitive vibration sources.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DETAILED DESCRIPTION OF THE PREFERRED EMBODIMENT

Figure 1:
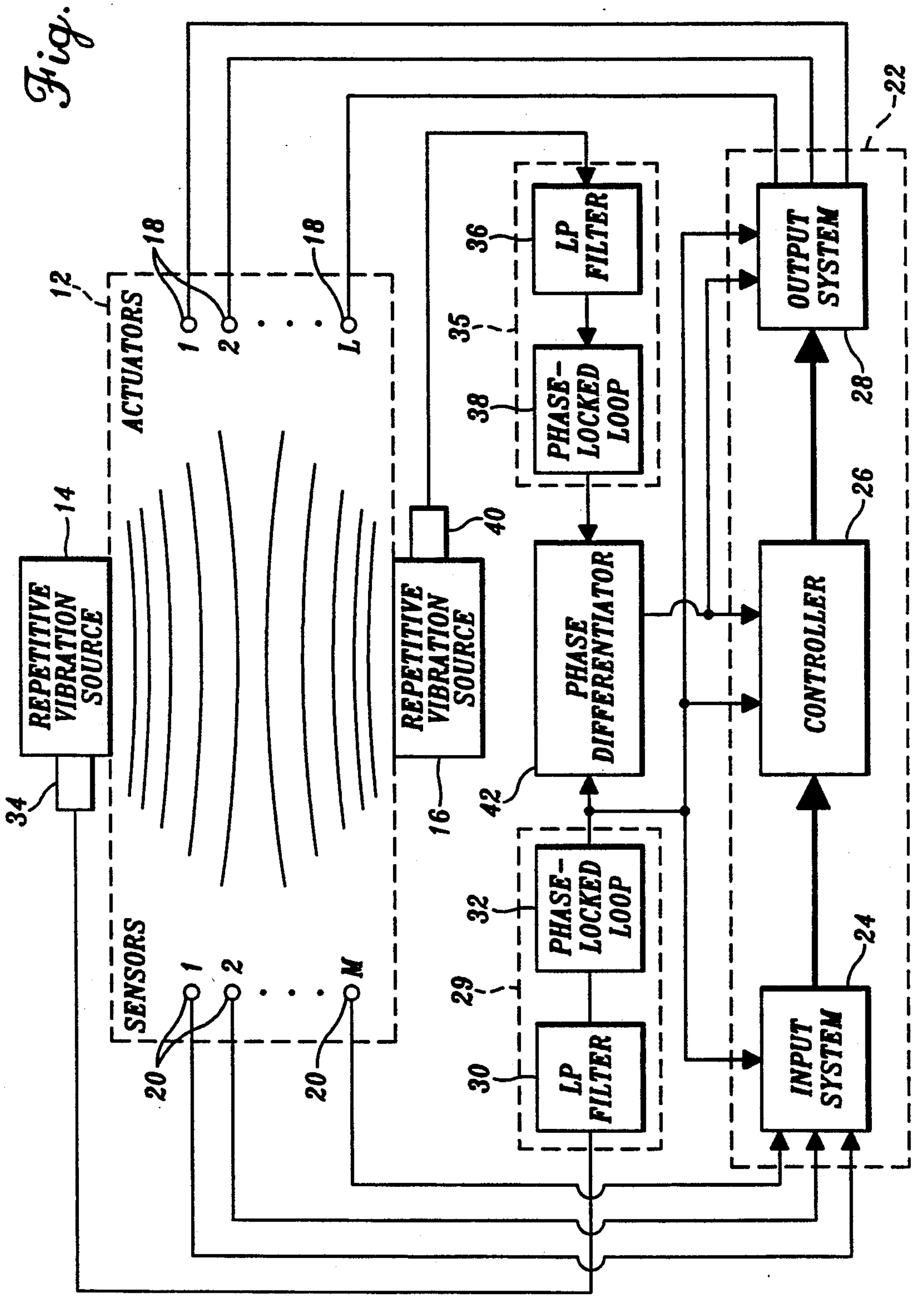
FIG. 1 is a simplified block diagram of an apparatus according to the invention for actively reducing multiple-source repetitive vibrations.

FIG. 1 is a simplified block diagram of an apparatus formed in accordance with the invention for actively reducing multiple-source repetitive vibrations in a region or structure 12. The method and apparatus of the invention can be used to effectively reduce repetitive vibrations produced by a plurality of repetitive vibration sources that differ slightly in frequency. For simplicity, the apparatus shown in FIG. 1 and the methods according to the invention shown in the succeeding figures describe an application in which there are two repetitive vibration sources operating at slightly different frequencies. It will be understood that the apparatus and method can be used to reduce repetitive vibrations produced by more than two repetitive vibration sources operating at slightly different frequencies.

Two representative vibration sources 14 and 16 produce repetitive vibrations in the region or structure 12. The purpose of the apparatus is to reduce the amplitude of the so-produced repetitive vibrations in the region or structure 12 because such vibrations are undesirable. The apparatus includes a plurality of actuators 18 that introduce control vibrations in the region or structure 12 to oppose the repetitive vibrations in the region or structure 12 produced by the sources 14 and 16. The control vibrations generated by the actuators 18 are dependent on the vibrations sensed by a plurality of sensors 20 located in the region or on the structure. The apparatus includes a multi-input/multi-output (MIMO) feedback control system 22 that cyclically updates source elements, of which the control vibrations are composed, so as to minimize the sensed vibrations. The MIMO feedback control system 22 includes an input system 24, a controller 26 that receives the output of the input system 24, and an output system 28 that receives the output of the controller 26. The input system 24 receives the output of each region/structure sensor 20, and the output system 28 calculates control signals using the source elements calculated by the controller 26 and drives the actuators 18 with these signals.

One of the repetitive vibration sources 14 is chosen as the reference source and the operation of the MIMO feedback control system 22 is synchronized with this source 14. A synchronized signal generator 29 that includes a low-pass (LP) filter 30 and a phase-locked loop 32 monitors the reference source 14 via a reference sensor 34. The output of the phase-locked loop 32 is a synchronized signal that is applied to the input system 24 and the output system 28 to synchronize the operation of these systems with the reference source 14. The synchronized signal generated by the phase-locked loop 32 is also fed to the controller 26 to define the frequency of the repetitive vibrations produced by the reference source 14. The repetitive vibration source 16 is monitored by another synchronized signal generator 35, which also includes a low-pass (LP) filter 36 and a phase-locked loop 38, via another sensor 40. The output of both the phase-locked loop 32 and the phase-locked loop 38 are input to a phase differentiator 42. Phase differentiator 42 determines the phase difference between the repetitive vibrations produced by the other source 16 and the reference source 14. The phase difference between the repetitive vibrations produced by the other source 16 and the reference source 14 varies with time because the other source 16 and the reference source 14 differ slightly in frequency. The phase differentiator 42 determines the instantaneous phase difference between the repetitive vibrations produced by the other source 16 and the repetitive vibrations produced by the reference source 14. The phase difference determined by the phase differentiator 42 is applied to the controller 26 and to the output system 28. The controller 26 uses the phase difference when calculating new source elements that compose the control vibrations. The output system 28 frequently recalculates control signals that drive the actuators to produce the control vibrations. The control signals are composed of two sets of source elements, one for controlling the vibrations produced by the reference source 14 and the other for controlling the vibrations produced by the other source 16. The control signals are frequently recalculated to accommodate for the varying phase difference between the sources.

Take, for example, application of the invention for the reduction of repetitive noise in the passenger cabin of a jet aircraft. In this example, the region or structure 12 is the gaseous region of the passenger cabin, and the repetitive vibrations are repetitive noises generated by the jet engines of a twin-jet aircraft, i.e., the reference source 14 and the other source 16 are the jet engines of the aircraft. An apparatus according to the invention reduces the repetitive noise to, among other things, improve the comfort of passengers. Further in this example, the actuators 18 are preferably loudspeakers, and the region/structure sensors 20 are preferably microphones. Both loudspeakers and microphones are preferably dispersed throughout the passenger cabin, and preferably the number of sensors is greater than the number of actuators. Without these preferred characteristics of actuator/sensor placement and actuator/sensor numbers, the MIMO feedback control system 22 may produce control vibrations that completely reduces the sensed vibrations at each sensor, but result in no appreciable reduction of the repetitive vibrations in the regions between the sensors. Still further in this example, the reference sensor 34 and the other sensor 40 are preferably tachometers respectively monitoring the rotational frequency of the reference source 14 and the other source 16 (jet engines). The jet engines have slightly different rotational frequencies, and thus produce repetitive vibrations of slightly different frequency. The frequency difference can be modeled as a time-varying phase between the jet engines. The input system 24, controller 26, and output system 28 are preferably on-board electronic devices including digital processors. The low-pass filters 30 and 36, the phase-locked loops 32 and 38, and the phase differentiator 42 are also preferably on-board electronic devices.

It will be appreciated that the invention can be used in various other applications to reduce repetitive vibrations. In such other applications, the majority of the devices of the frequency-domain vibration controller could be the same electronic devices. However, the choice of sensors and actuators will depend on the application. For example, if the invention is used to reduce repetitive vibrations in a structure that consists of an electronic transformer, the region/structure sensors 20 would preferably be accelerometers and the actuators 18 would preferably be shakers; both accelerometers and shakers would be attached to the transformer.

The synchronized signal generators 29 and 35 monitor the frequency and phase of the repetitive vibrations produced respectively by the reference source 14 and the other source 16. As mentioned previously, the synchronized signal generator 29 includes a low-pass (LP) filter 30 and a phase-locked loop 32. The reference sensor 34 generates a reference signal which is applied to the low-pass filter 30 and the output of the low-pass filter 30 is applied to the phase-locked loop 32. The reference phase-locked loop 32 produces a synchronized signal that is applied to the phase differentiator 42, the input system 24, the controller 26, and the output system 28. The reference signal produced by the reference sensor 34 is filtered by the low-pass filter 30 to remove any high frequencies in the reference signal that could erroneously trigger the phase-locked loop 32. Similarly, the synchronized signal generator 35 includes the low-pass (LP) filter 36 and the phase-locked loop 38. The sensor 40 coupled to the other source 16 generates a reference signal which is applied to the low-pass filter 36, and the output of the low-pass filter 36 is applied to the phase-locked loop 38. The output of the phase-locked loop 38 is applied to the phase differentiator 42.

The difference between the frequency of the repetitive vibrations produced by the other source 16 and the frequency of the repetitive vibrations produced by the reference source 14 is modeled as a time-varying phase difference. The phase differentiator 42 determines this phase difference based upon the inputs from the synchronized signal generators 29 and 35. The reference source 14 produces repetitive vibrations having a frequency $f_{14}$ and the other source 16 produces repetitive vibrations of frequency $f_{16}$ (fundamental frequencies). In applications the invention is directed to, the frequencies $f_{14}$ and $f_{16}$ are slightly different and may vary with time. The difference in frequencies is modeled as a phase difference $\phi$ as defined in the following equation:

$$\phi = 2\pi \int (f_{16} - f_{14})dt \qquad (1)$$

Equation (1) will be recognized to be a time integral of the difference in the frequency of the other source 16 and reference source 14. The phase difference $\phi$ produced by the phase differentiator 42 is applied to the controller 26 and the output system 28. If there were more than two repetitive vibration sources, say for example, three repetitive vibration sources, the apparatus according to the invention would include a third synchronized signal generator. The phase differentiator would determine the phase difference between the third source and the reference source 14, in addition to determining the phase difference between the other source 16 and the reference source 14. Both phase differences would be fed to the controller 26 and to the output system 28. If additional repetitive vibration sources existed, similar modifications would be made for the additional sources.

FIG. 1 shows the MIMO feedback control system 22 in simplified block diagram form. The MIMO feedback control system 22 is shown to include the input system 24, the controller 26, and the output system 28. Preferred components of the input system 24, the controller 26, and the output system 28 are described in U.S. patent application Ser. No. 07/577,223, referenced more fully above, which is incorporated herein by reference. The frequency-domain vibration controller described in said United States Patent Application has an input system comprised of bandpass filters, a sampling system, an input memory, and a digital signal processor. The controller of the frequency-domain vibration controller includes a central memory and a master processor, and the output system includes an output memory, an output sequencer, low-pass filters, and a digital signal processor.

Figure 2:
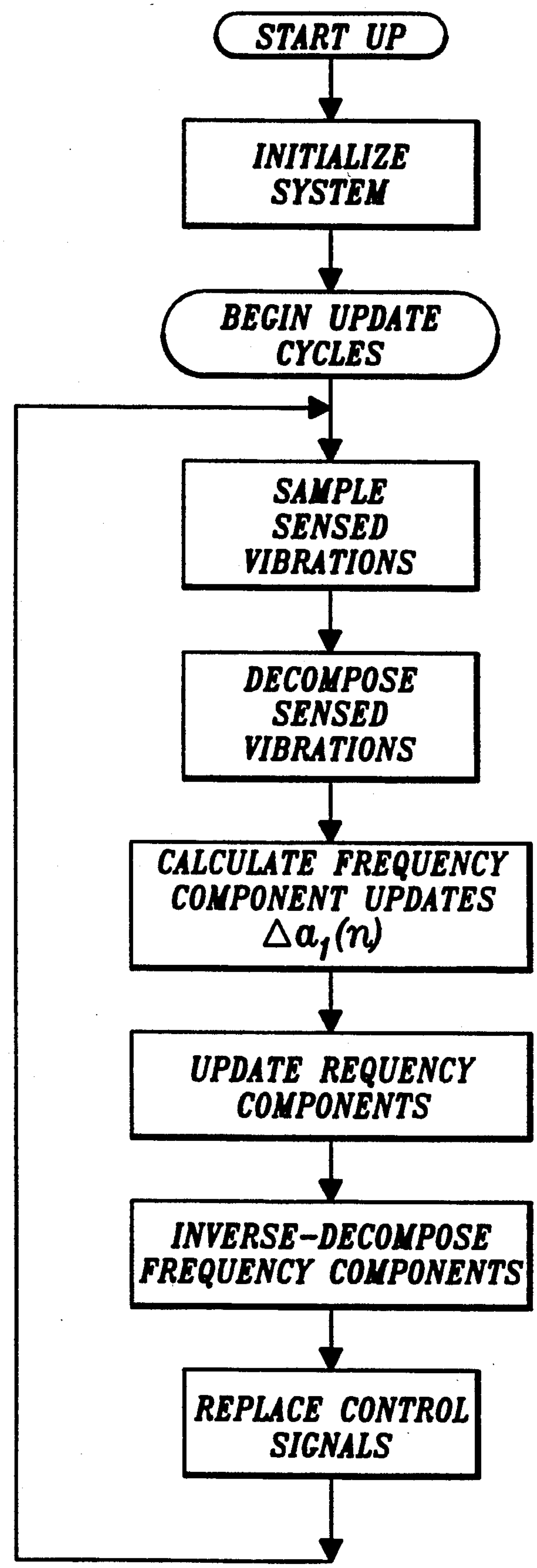
Fig.2. PRIOR ART
FIG. 2 is a simplified flow diagram illustrating a prior art method of operating frequency-domain vibration controllers.

Excluding the phase differentiator 42, synchronized signal generator 35, and the other sensor 40, the apparatus shown in FIG. 1 is preferably the same as the prior art frequency-domain vibration controller described in U.S. patent application Ser. No. 07/575,223 and except for the modification discussed herein, its method of operation is the same. In order to avoid unduly complicating the description of the present invention only a brief description of a frequency-domain vibration controller of the type described in the foregoing patent application is presented herein. The description assumes that either the other repetitive vibration source 16 operates at exactly the same frequency as the reference repetitive vibration source 14 or the other repetitive vibration source 16 does not exist. As shown in FIG. 2, the system is first initialized by performing a start-up sequence resulting in the application of control vibrations in the region or structure 12, followed by the periodic execution of an update cycle in which the control vibrations are updated. The update cycle consists of sensing the sensed vibrations, decomposing the sensed vibrations, calculating frequency component updates, updating the frequency components, and inverse-decomposing the frequency components to obtain new control signals with which to drive the actuators.

During the start-up sequence, the input system 24 samples the analog signal produced by each sensor 20 for a plurality of discrete times to produce digital input signals corresponding to the vibration sensed at each sensor location. The input system 24 decomposes the digital input signals into a set of frequency components S by performing a Fast Fourier Transformation (FFT) on each digital input signal. The amplitudes and phases determined by the FFT are passed to the controller 26. In response, the controller 26 calculates amplitudes and phases for the frequency components of set S to be used to compose the control vibrations. The amplitudes and phases for the control vibrations are stored in the form of complex numbers in the controller 26. The complex numbers are denoted output complex amplitudes $a_]( n)$, where ] identifies a specific actuator and n identifies a specific frequency component. The output complex amplitudes $a_](n)$ are passed to the output system 28. The output system 28 inverse-decomposes the output complex amplitudes $a_](n)$ corresponding to the ]th actuator by performing an inverse FET. The result of each inverse FET is a digital control signal $a_](t_k)$ corresponding to the ]th actuator and is stored in the output system 28. The output system 28 converts each digital control signal $a_](t_k)$ to an analog control signal $a_](t)$ and simultaneously applies the analog control signals $a_](t)$ to the corresponding actuators. In response to the applied signal, each actuator generates a corresponding control vibration. Thereafter, each control vibration is cyclically updated to improve the reduction of the sensed vibrations.

The update cycles are similar to the initialization start-up sequence. The input system 24 samples the sensed vibrations to produce digital input signals. The input system 24 then decomposes each digital input signal by performing FETs. The resulting amplitudes and phases are used by the controller 26 to calculate frequency component updates. The frequency component updates are complex numbers used to update the output complex amplitudes $a_](n)$. The frequency component updates are denoted output complex amplitude updates $\Delta a_](n)$. The output complex amplitude updates $\Delta a_](n)$ are added to the corresponding output complex amplitudes $a_](n)$ to update the output complex amplitudes $a_](n)$. To conclude the update cycle, the output complex amplitudes $a_](n)$, only some of which may have been updated, are inverse-decomposed by performing inverse FFTs, producing new digital control signals $a_](t_k)$. The new digital control signals replace the digital control signals currently stored in the output system 28. The next update cycle is then performed in the same manner.

The frequency-domain vibration controller described in the foregoing patent application operates synchronously with the reference repetitive vibration source 14. The input system 24 samples the sensed vibrations at discrete times synchronized with the reference source 14 via a synchronized signal produced by the phase-locked loop 32. The phase-locked loop 32 produces a synchronized signal that is synchronized with the repetitive vibrations produced by the reference source 14 and consists of several pulses per period of the repetitive vibrations produced by the reference source 14. The pulses of the synchronized signal trigger the sampling of the input system 24. Further, the input system 24 decomposes the digital input signals, resulting from sampling of the sensed vibrations, into a set S of frequency components. The frequency components of set S are preferably the fundamental frequency of the repetitive vibrations produced by the reference source 14 and the first (N−1) harmonics thereof. The fundamental frequency of the repetitive vibrations produced by the reference source 14 is defined by the phase-locked loop 32. The synchronized signal consists of a constant number of pulses per period of the repetitive vibrations produced by the reference source 14. By counting the number of pulses for some period of time, the frequency of the repetitive vibrations can be determined. Still further, the controller 26 calculates output complex amplitudes $a_](n)$ for the frequency components of set S, and the output system inverse-decomposes the output complex amplitudes $a_](n)$ to obtain digital control signals $a_](t_k)$. The output system 28 sequences through the digital control signals $a_](t_k)$ synchronously with the reference source 14; the digital control signals $a_](t_k)$ are converted to analog signals at times corresponding to the pulses of the synchronized signal produced by the phase-locked loop 32.

Because the frequency-domain controller operates synchronously with the reference source 14, the frequency-domain vibration controller is not able to effectively reduce repetitive vibrations in the region or structure 12 if there are repetitive vibration sources, in addition to the reference source 14, which produce repetitive vibrations of different frequencies. The present invention modifies the frequency-domain vibration controller described in the foregoing patent application in a manner that allows the controller to effectively reduce repetitive vibrations produced by multiple repetitive vibration sources operating at slightly different frequencies. While the present invention is being discussed with reference to the frequency-domain vibration controller described in the foregoing patent application, it is to be understood that the invention can be used to enhance other types of frequency-domain vibration controllers to achieve the same end result.

As mentioned previously, FIG. 1 shows an apparatus according to the present invention. The other repetitive vibration source 16 is monitored by the other sensor 40 and the synchronized signal generator 35. The phase differentiator 42 determines the phase difference, $\phi$, between the repetitive vibrations produced by other source 16 and the reference source 14, as defined in Equation (1). The phase-locked loop 38 produces a signal synchronized with the repetitive vibrations produced by the other source 16 and consisting of a constant number of pulses per period of the repetitive vibrations produced by the other source 16. Preferably, the synchronized signals produced by phase-locked loop 38 and phase-locked loop 32 consist of the same number of pulses per period of the repetitive vibrations produced by the sources 16 and 14, respectively. Then, preferably, the phase differentiator 42 receives the synchronized signals produced by phase-locked loops 38 and 32, accumulates the number of pulses in each synchronized signal, and determines the phase difference, $\phi$, based upon the difference in the number of pulses as shown in the following equation:

$$\phi = 2\pi(I_{16} - I_{14})/I \quad (2)$$

$I_{16}$ and $I_{14}$ are respectively the number of pulses accumulated from the synchronized signals produced by the phase-locked loops 38 and 32, and I is the number of pulses per period of the repetitive vibrations produced by both sources. The frequency-domain vibration controller shown in FIG. 1 is operated synchronously with the reference source 14. The controller 26 and the output system 28 use the phase difference, $\phi$, to adjust the control vibrations so that the repetitive vibrations produced by the combination of the reference source 14 and the other source 16 are effectively reduced in the region or structure 12.

Figure 3:
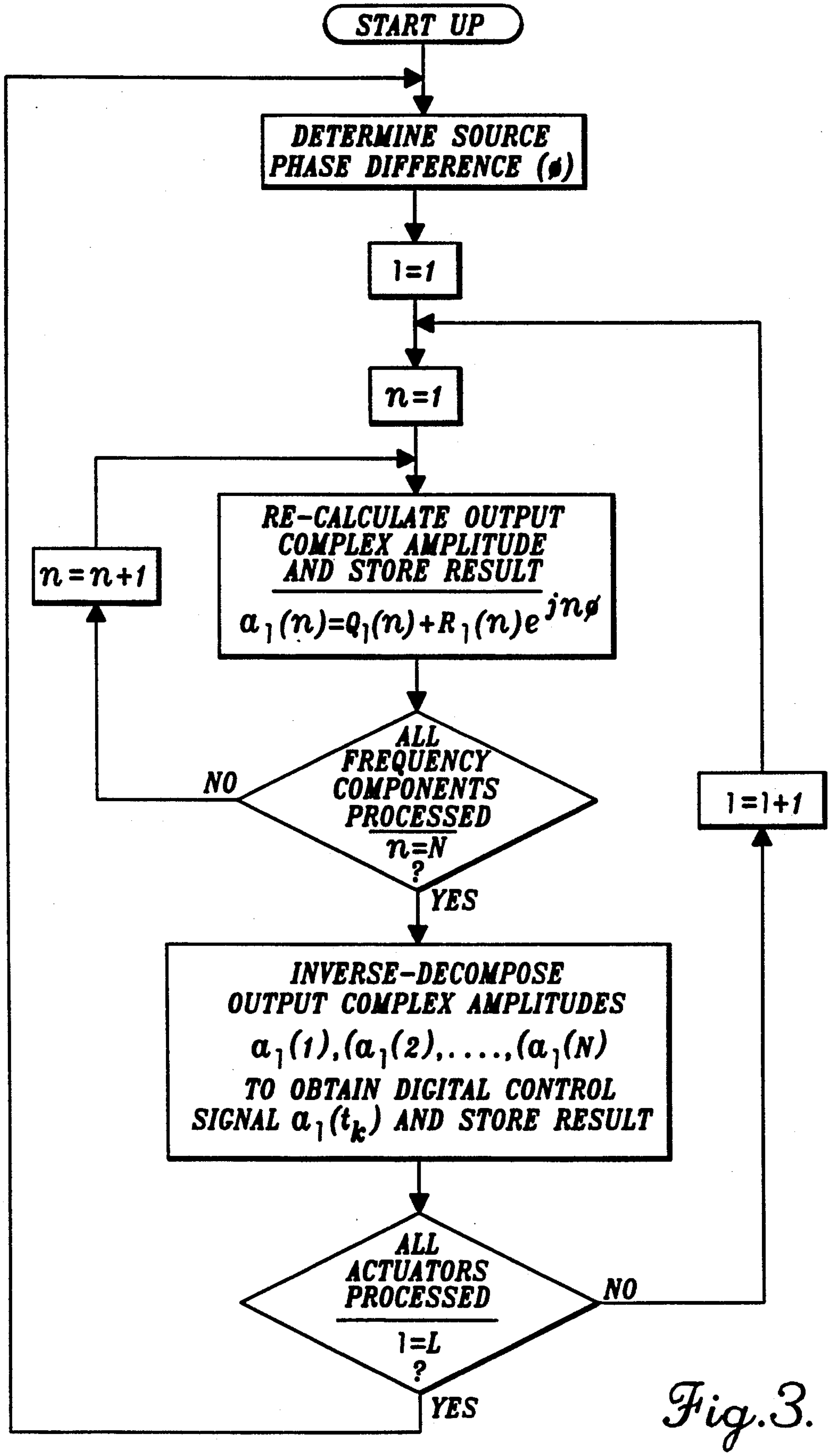
FIG. 3 is a flow diagram illustrating a method according to the invention of recalculating control vibrations based upon phase differences between the repetitive vibration sources.

The flow diagram in FIG. 3 illustrates the preferred method of operation of the output system 28 to accommodate the phase difference between the sources 16 and 14. Briefly, each output complex amplitude $a_l(n)$ is composed of a source element for cancelling vibrations produced by the reference source 14 and a source element for cancelling vibrations produced by the other source 16. The output complex amplitudes $a_l(n)$ are calculated using the source elements and the instantaneous phase difference. All of the output complex amplitudes are calculated for the most recently determined phase difference. The output complex amplitudes are then inverse-decomposed to obtain digital control signals $a_l(t_k)$. The digital control signals are then stored in the output system and are used to generate the control vibrations. Subsequently, the phase difference, $\phi$, is again determined. The output complex amplitudes are then recalculated using this present phase difference. The recalculated output complex amplitudes are then inverse-decomposed to obtain new digital control signals which replace the previously used digital control signals. This process of recalculating the digital control signals is repetitively applied and is explained in detail with reference to FIG. 3 in the following paragraphs.

The process of FIG. 3 is started by determining the present phase difference between the other source 16 and the reference source 14. The digital control signal corresponding to each actuator is sequentially recalculated based upon the present phase difference. $l$ is initialized to 1, and the digital control signal $a_l(t_k)$ is recalculated after recalculating each output complex amplitude $a_l(n)$ corresponding to the $l$th actuator. n is initialized to 1, and the output complex amplitude $a_l(n)$ is recalculated according to the following equation:

$$a_l(n)=Q_l(n)+R_l(n)e^{jn\phi} \quad (3)$$

In Equation (3) and hereinafter, $Q_l(n)$ and $R_l(n)$ are complex numbers representing the source elements corresponding to the reference source 14 and the other source 16, respectively. Further, e is the natural logarithm base, j is the square root of $-1$, and $\phi$ is the phase difference. As mentioned previously, $a_l(n)$ is the output complex amplitude corresponding to the nth frequency component of the digital control signal applied to the $l$th actuator. Each output complex amplitude $a_l(n)$ has two corresponding source elements $Q_l(n)$ and $R_l(n)$. A preferred method of calculating the source elements $Q_l(n)$ and $R_l(n)$ is presented hereinafter.

In Equation (3), the factor $e^{jn\phi}$ incorporates the phase difference $n\phi$ between the nth frequency component of the sensed vibration produced by the other source 16 and the nth frequency component of the sensed vibration produced by the reference source 14. $\phi$ is the phase difference between the fundamental frequency component of the sensed vibrations produced by the other source 16 and the reference source 14, and $n\phi$ is the phase difference between the nth frequency component of the sensed vibrations produced by the other source 16 and the reference source 14. This will be readily understood by those skilled in the signal processing art since n is the harmonic number of the frequency component.

After the output complex amplitude $a_l(n)$ is calculated, the result is stored. Until all frequency components are processed for the $l$th actuator, n is sequentially incremented by 1 and the output complex amplitude $a_l(n)$ is recalculated for the $l$th frequency component in the same manner. After all frequency components have been processed for the $l$th actuator, the set of complex amplitudes $(a_l(1), a_l(2), \ldots, a_l(N))$ are inverse-decomposed by performing an inverse FET to obtain a new digital control signal $a_l(t_k)$. The new digital control signal $a_l(t_k)$ replaces the digital control signal currently stored in the output system 28 to drive the $l$th actuator. If all actuators have not been processed, $l$ is incremented by 1 and the digital control signal $a_l(t_k)$ corresponding to the next actuator is recalculated in the same manner. This process is sequentially repeated until all digital control signals are recalculated, i.e., all actuators are processed. After processing all actuators, the entire process is again repeated for a new phase difference $\phi$. In this manner, the digital control signals are frequently recalculated to accommodate for the time-varying phase difference $\phi$ between the source 16 and the reference source 14.

While the process illustrated in FIG. 3 recalculates control signals to accommodate the difference in the frequency of two sources, it will be appreciated that the process can be used for any number of sources differing in frequency. For example, if there were a third source producing repetitive vibrations in the region or structure 12, then the composition of the output complex amplitude $a_l(n)$ would include a third source element multiplied by a factor including the phase difference between the third source and the reference source 14.

Figure 4A:
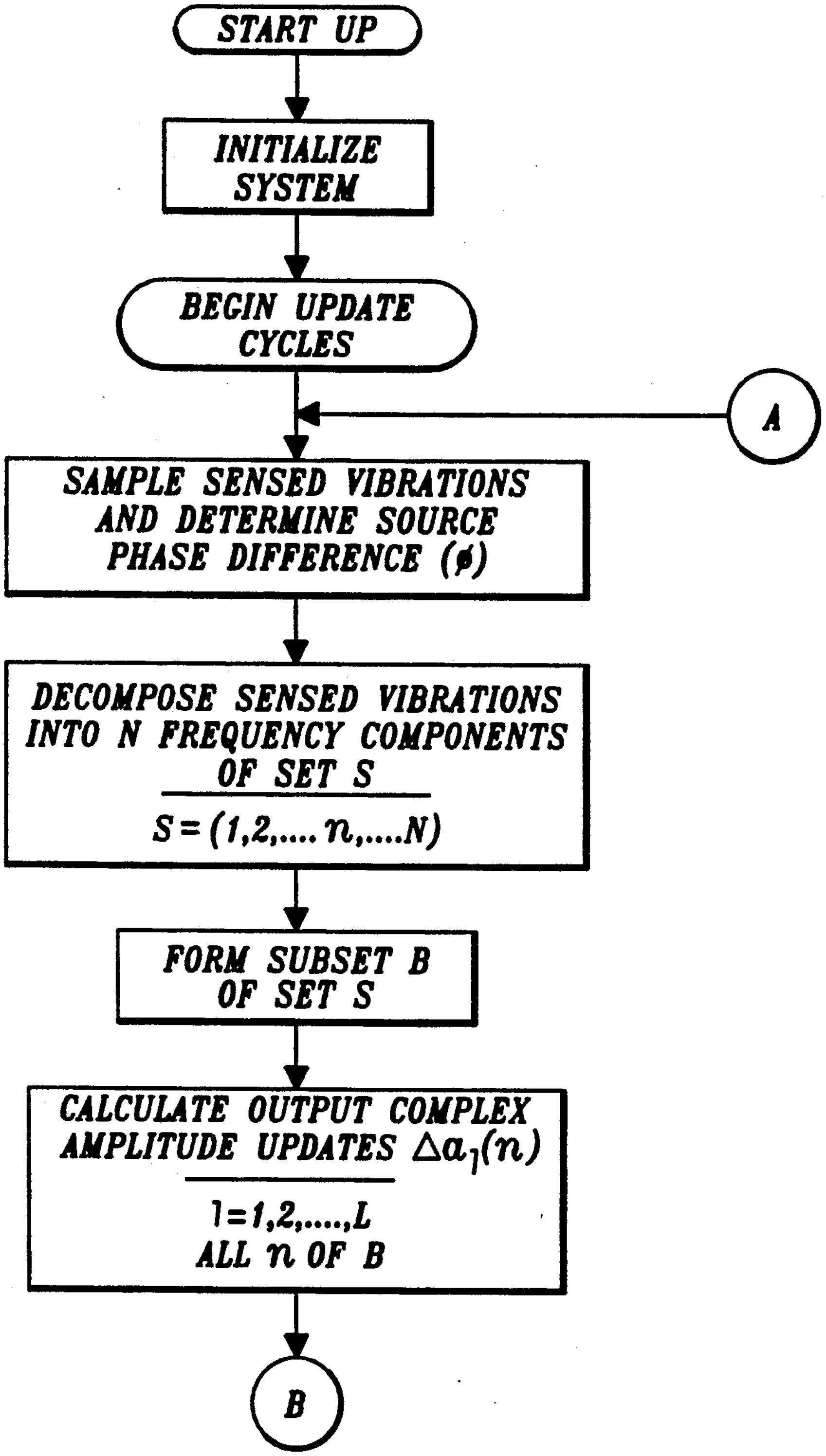
FIGS. 4A and 4B form a composite flow diagram illustrating a method according to the invention of updating source elements of the control vibrations.
Figure 4B:
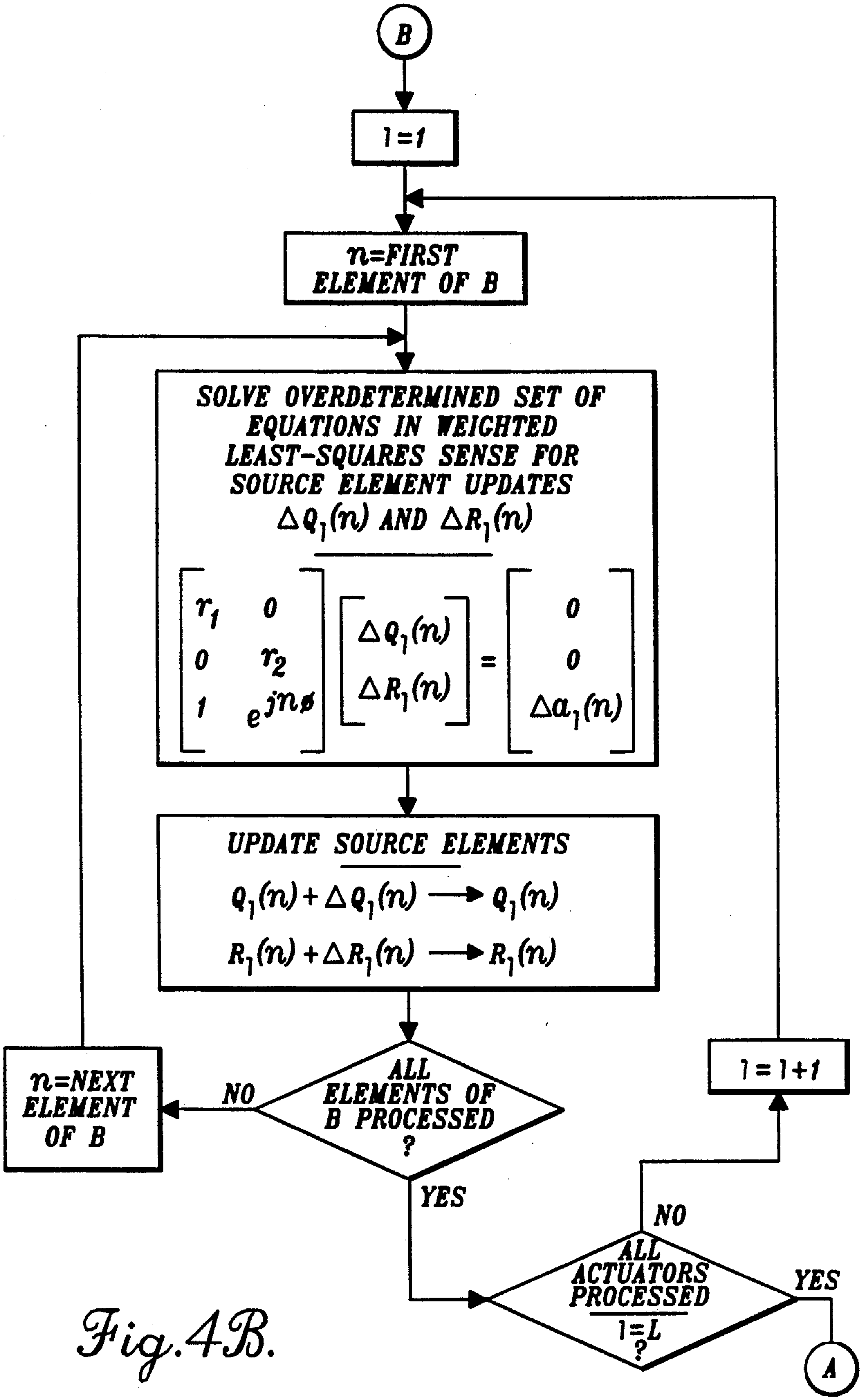

The source elements $Q_l(n)$ and $R_l(n)$ are cyclically updated with an update cycle. Between updates of the source elements, the digital control signals are frequently recalculated based upon the source elements and the instantaneous phase difference determined before each recalculation of the digital control signals. FIGS. 4A-B form a flow diagram illustrating a preferred method of updating the source elements. The process shown in FIGS. 4A-B is similar to the method of operation of the previously referred-to frequency-domain vibration controller, which was described with reference to FIG. 2. Specifically, the last three steps (updating of the frequency components, inverse-decomposing the frequency components, and replacing the control signals) are modified by the present invention to accommodate for the frequency difference between the sources. As will be better understood from the following description, FIGS. 4A-B illustrate the entire process of updating the source elements, rather than being limited to the modifications of the last three steps shown in FIG. 2. In FIGS. 4A-B the method of updating the source elements is shown in detail. The other steps, which have been previously discussed with reference to the method shown in FIG. 2, are shown at a higher level. These steps are described in greater detail in U.S. patent application Ser. No. 07/575,223, which has been incorporated herein by reference.

Before beginning the update cycles, the system is initialized with a start-up sequence. Preferably, the start-up sequence is similar to the start-up sequence of the frequency-domain controller discussed above with reference to FIG. 2. In the start-up sequence, first estimates of the source elements $Q_l(n)$ and $R_l(n)$ are determined and the output system uses the source elements to sequentially recalculate control signals as shown in FIG. 3. Subsequently, the source elements are cyclically updated as described in the following paragraphs with reference to FIGS. 4A–B.

The update cycle is begun by sampling the sensed vibrations and then decomposing the sensed vibrations into the N frequency components of set S, as described previously for the frequency-domain vibration controller. During the sampling of the sensed vibrations, the instantaneous phase difference, $\phi$, will vary constantly if there is a difference between the frequency of the reference source 14 and the other source 16. A representative value of the phase difference during the sampling of the sensed vibrations is needed. Preferably, the instantaneous phase difference determined at the time when the sampling of the sensed vibrations is half completed is used as the representative value. However, the phase difference, $\phi$, determined at different times, for example, at the beginning of sampling the sensed vibrations could be used as the representative value, or the average value of the phase difference during the sampling of the sensed vibrations could be determined and used. Preferably, the next step comprises forming a subset B of the set S of frequency components, with the subset B having fewer frequency components than the set S. The subset B can be formed, for example, by selecting the frequency components of set S that have the largest sensed vibration magnitude. The source elements corresponding to the frequency components of subset B are then updated as described in the following paragraphs. Only the frequency components of subset B are updated during an update cycle so that the update cycle is relatively fast, as described in detail in U.S. patent application Ser. No. 07/575,223, incorporated herein by reference.

After forming the subset B of frequency components, updates are calculated for the output complex amplitudes $a_\ell(n)$. The output complex amplitude updates $\Delta a_\ell(n)$ can be calculated using either of the methods described in the U.S. patent application Ser. No. 07/575,223. It is to be understood that the updates $\Delta a_\ell(n)$ can be calculated with methods other than those disclosed therein without departing from the spirit of the present invention.

The source elements corresponding to the frequency components of subset B are sequentially updated for each actuator. $\ell$ is initialized to 1. The source elements of the frequency components of subset B are sequentially updated for the $\ell$th actuator. n is initialized to the first element of the subset B. Source element updates $\Delta Q_\ell(n)$ and $\Delta R_\ell(n)$ are calculated by solving the following overdetermined set of equations in a weighted least-squares sense:

$$\begin{vmatrix} \gamma_1 & 0 \\ 0 & \gamma_2 \\ 1 & e^{jn\phi} \end{vmatrix} \begin{vmatrix} \Delta Q_\ell(n) \\ \Delta R_\ell(n) \end{vmatrix} = \begin{vmatrix} 0 \\ 0 \\ \Delta a_\ell(n) \end{vmatrix} \quad (4)$$

$\Delta a_\ell(n)$ is an output complex amplitude update determined in the previous step of calculating updates for the output complex amplitudes. $\gamma_1$ and $\gamma_2$ are scalar factors, which can have different values for each combination of $\ell$ and n. $\phi$ is the representative value of the phase difference between the other source 16 and the reference source 14.

The matrix Equation (4) represents three linear equations with two unknowns, $\Delta Q_\ell(n)$ and $\Delta R_\ell(n)$, and therefore the system of equations represents an overdetermined set of equations. Since the matrix Equation (4) represents an overdetermined set of equations, the matrix equation is solved in a weighted least-squares sense. Solving overdetermined equations in a weighted least-squares sense is well known to those skilled in the linear algebra art. The larger the factors $\gamma_1$ and $\gamma_2$ are chosen, the smaller the source element updates $\Delta Q_\ell(n)$ and $\Delta R_\ell(n)$ will be and, as a result, the slower the source elements $Q_\ell(n)$ and $R_\ell(n)$ will change. The source elements are updated by adding the source element updates to the corresponding source elements, i.e., $\Delta Q_\ell(n)$ is added to $Q_\ell(n)$, and $\Delta R_\ell(n)$ is added to $R_\ell(n)$. If all elements of the subset B have not been processed, n is set equal to the next element of subset B, and source element updates are calculated for the nth frequency component of the digital control signal $a_\ell(t_k)$ corresponding to the $\ell$th actuator. This process is sequentially repeated until all frequency components of subset B are processed for the $\ell$th actuator. After processing all frequency components of subset B for the $\ell$th actuator, $\ell$ is incremented by 1 and the source elements of the $\ell$th actuator are updated in the same manner. This entire process is repeated until all actuators have been processed, e.g., the source elements of each digital control signal $a_\ell(t_k)$ are updated.

After the source elements are updated, the update cycle is completed. The next update cycle, consisting of the same steps, is begun as shown in FIG. 4A. The process of recalculating the digital control signals $a_\ell(t_k)$, illustrated in FIG. 3 and discussed previously herein, utilizes the updated source elements.

While FIGS. 4A–B illustrate a preferred method of updating the source elements, it will be appreciated that other methods of updating the source elements could be used without departing from the spirit of the invention. For example, the steps of the update cycle shown in FIG. 4A could be executed twice before recalculating the source elements. The result would be two values for each output complex amplitude update $\Delta a_\ell(n)$ and two corresponding values for the phase difference, $\phi$. The two values for the output complex amplitude update $\Delta a_\ell(n)$ and the two values for the phase difference could be combined to form two linear equations (of the form of Equation 3) in the source element updates $\Delta Q_\ell(n)$ and $\Delta R_\ell(n)$. These equations could then be solved for the source element updates $\Delta Q_\ell(n)$ and $\Delta R_\ell(n)$.

As a further alternative method of updating the source elements, input complex amplitudes resulting from decomposing the sensed vibrations could be decomposed into source elements and the resulting input source elements could be transformed into updates for the source elements of the output complex amplitudes. As previously described, the sensed vibrations are decomposed into the N frequency components of set S, which correspond to the frequency components of the reference source 14. The results of the decompositions are preferably input complex amplitudes $p_m(n)$. For a particular m and n, the input complex amplitude $p_m(n)$ represents the amplitude and phase of the nth frequency component of the vibration sensed at the mth sensor. In applications the present invention is directed to, the fundamental frequencies $f_{14}$ and $f_{16}$ of the repetitive vibration sources 14 and 16 are close in value. As a result, the input complex amplitudes $p_m(n)$ for a particular n represent the nth frequency component of the vibrations produced by the other source 16 as well as the nth frequency component of the vibrations produced by the reference source 14. However, because the other source 16 operates at a slightly different frequency than the reference source 14, the input complex amplitudes $p_m(n)$ vary with time. It follows that the corresponding output complex amplitudes $a_l(n)$ must vary with time to effectively reduce the nth frequency component of the sensed vibrations.

Preferably, as described previously, the input complex amplitudes $p_m(n)$ are transformed by a frequency-domain operation to obtain output complex amplitude updates $\Delta a_l(n)$. Further in the preferred method of operation, the output complex amplitude updates $\Delta a_l(n)$ are decomposed into source element updates $\Delta Q_l(n)$ and $\Delta R_l(n)$, which are then used to update the source elements $Q_l(n)$ and $R_l(n)$ of the output complex amplitudes. Still further in the preferred method of operation, the output source elements $Q_l(n)$ and $R_l(n)$ are then used to frequently recalculate output complex amplitudes to accommodate for the frequency difference between the other source 16 and the reference source 14, e.g., to effectively reduce the time varying input complex amplitudes $p_m(n)$.

However, if the input complex amplitudes $p_m(n)$ are decomposed into input source elements $X_m(n)$ and $Y_m(n)$, then these input source elements could be transformed into output source element updates $\Delta Q_l(n)$ and $\Delta R_l(n)$. The transformation of the input source elements could be accomplished in manners similar to the transformation of the input complex amplitudes $p_m(n)$ into output complex amplitude updates $\Delta a_l(n)$, i.e., using transfer function matrices as discussed in the U.S. patent application Ser. No. 07/575,223, incorporated herein by reference.

The input source elements would be defined by the following equation:

$$p_m(n) = X_m(n) + Y_m(n)e^{jn\phi} \quad (5)$$

The input source elements could be recalculated each update cycle with a process similar to that shown in FIG. 4B. The resulting input source elements $X_m(n)$ and $Y_m(n)$ would then be transformed into output source element updates $\Delta Q_l(n)$ and $\Delta R_l(n)$. The update cycle would be completed by updating the output source elements $Q_l(n)$ and $R_l(n)$ with the updates.

As a still further alternative method of operation of a frequency-domain vibration controller according to the present invention, the frequency-domain vibration controller could be, and may preferably be, synchronized at some reference frequency other than the frequency of either of the sources of repetitive vibrations. For example, the frequency-domain vibration controller could operate at a reference frequency f that is the average of the frequencies $f_{14}$ and $f_{16}$ of the sources 14 and 16. In this example, the repetitive vibrations would be sensed synchronously at the reference frequency f, and the control vibrations would be applied synchronously at the reference frequency f. The sensed vibrations would be decomposed into frequency components corresponding to the reference frequency f and multiples thereof. The control vibrations would be composed of the same frequency components. The output complex amplitudes $a_l(n)$ would be decomposed into source elements. The source elements would then be used to frequently recalculate the output complex amplitudes using the following equation:

$$a_l(n) = V_l(n)e^{jn\phi 14} + W_l(n)e^{jn\phi 16} \quad (6)$$

In Equation (6), $\phi_{14}$ represents the phase difference resulting from the difference between the frequency of one source 14 and the reference frequency f, and similarly, $\phi_{16}$ represents the phase difference resulting from the difference between the frequency of the other source 16 and the reference frequency f. In this alternative method, the output complex amplitudes would be recalculated as shown in FIG. 3 using Equation (6). The source elements $V_l(n)$ and $W_l(n)$ could be updated with a method similar to the method shown in FIGS. 4A-B, Equation (7), which follows, would be used in place of Equation (4).

$$\begin{vmatrix} \gamma_1 & 0 \\ 0 & \gamma_2 \\ e^{jn\phi 14} & e^{jn\phi 16} \end{vmatrix} \begin{vmatrix} \Delta V_l(n) \\ \Delta W_l(n) \end{vmatrix} = \begin{vmatrix} 0 \\ 0 \\ \Delta a_l(n) \end{vmatrix} \quad (7)$$

Figure 5:
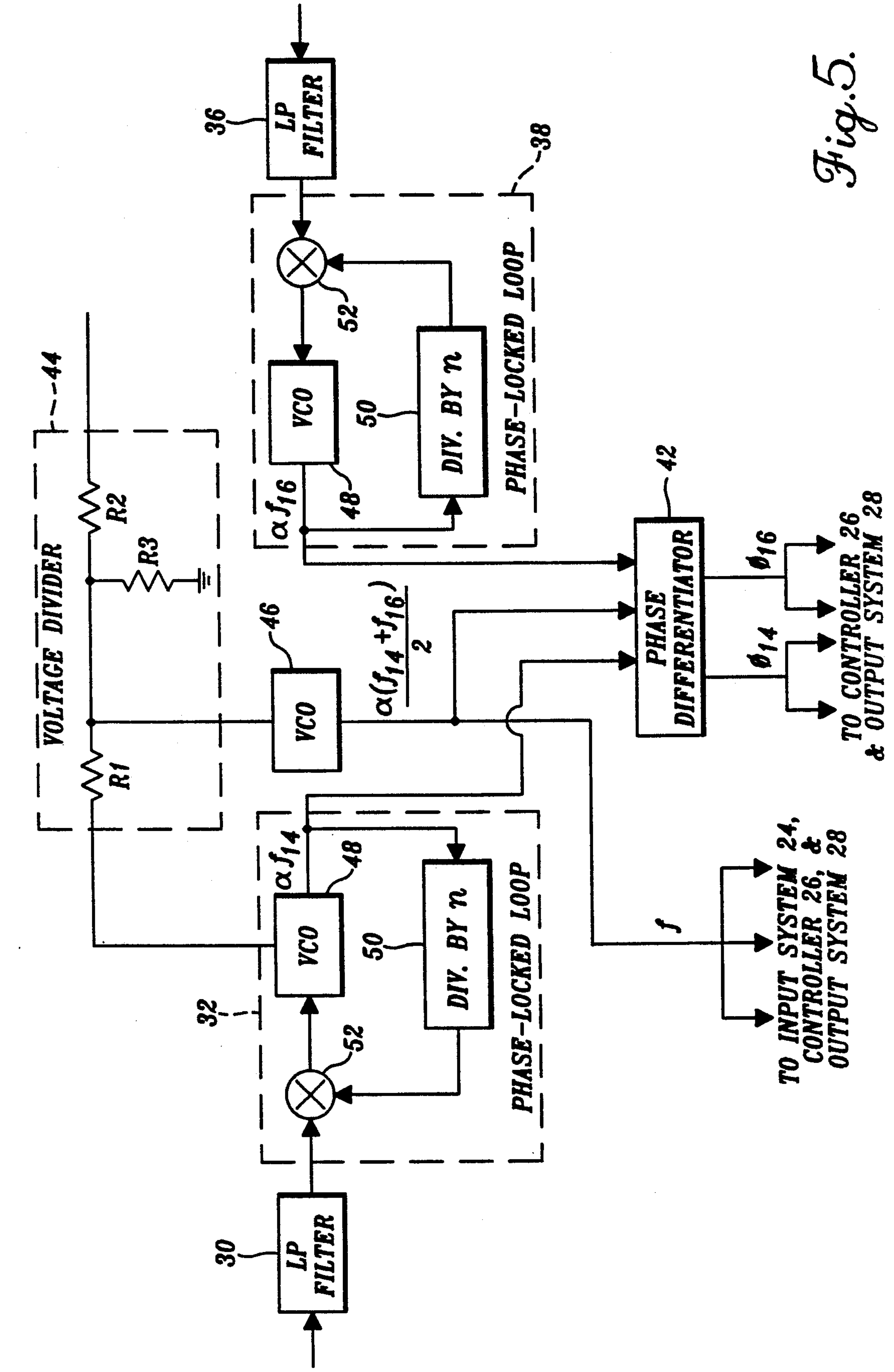
FIG. 5 is a block diagram of an alternative embodiment of a portion of the apparatus illustrated in FIG. 1.

FIG. 5 is a block diagram of a portion of the apparatus shown in FIG. 1 modified in accordance with this alternative method of operation. The apparatus shown in FIG. 5 produces the reference frequency f and determines the phase differences $\phi_{14}$ and $\phi_{16}$. The modifications include the addition of a voltage divider 44 and a voltage-controlled oscillator (VCO) 46. The low-pass filters 30 and 36 and the phase-locked loops 32 and 38 of the synchronized signal generators 29 and 35, and the phase differentiator 42 are also shown in FIG. 5 for ease of understanding. Subcomponents of the phase-locked loops are also illustrated in FIG. 5. More specifically, each phase-locked loop 32 and 38 is illustrated as including a voltage-controlled oscillator (VCO) 48, a frequency divider 50 and a multiplier 52, the typical components of a phase-locked loop. The outputs of the low-pass filters 30 and 36 are connected to first inputs of the related multipliers 52. The outputs of the multipliers 52 are connected to the voltage control inputs of the VCOs 48, and the synchronized signal outputs of the VCOs 48 are connected through the frequency dividers 50 to the other inputs of the multipliers 52.

As noted above, the output of the low-pass filters 30 and 36 are reference signals based upon the repetitive vibration sources 14 and 16, i.e., the reference signals have frequencies $f_{14}$ and $f_{16}$. The outputs of the VCOs 48 are synchronized signals that, as a result of the feedback loop formed by the frequency dividers 50, are synchronized with the reference signals associated with the sources 14 and 16. The synchronized signal produced by one VCO 48 has a frequency $\alpha f_{14}$, i.e., a multiple of the frequency $f_{14}$ and the synchronized signal produced by the other VCO 48 has a frequency of $\alpha f_{16}$, i.e., a multiple of the frequency $f_{16}$. The VCOs 48 also produce DC voltages that are proportional to the frequencies $\alpha f_{14}$ and $\alpha f_{16}$.

The DC voltages produced by the VCOs of the phase-locked loops 32 and 38 are applied to the voltage divider 44. The voltage divider 44 produces a voltage that is the average of the two DC input voltages and, as shown in FIG. 5, may consist of three equal valued resistors R1, R2 and R3. The DC voltage output of one VCO 48 is connected to one end of R1 and the DC voltage output of the other VCO 48 is connected to one end of R2. The other ends of R1 and R2 are connected together and through R3 to ground.

The output of the voltage divider 44, i.e., the junction of R1, R2 and R3 is connected to the VCO 46, which in response to the input voltage produces a reference signal consisting of a train of pulses having a frequency that is the average of the two synchronized signals namely, $\alpha(f_{14}+f_{16})/2$. The reference signal produced by the VCO 46 and the synchronized signals produced by the phase-locked loops 32 and 38 are all applied to the phase differentiator 42. Based upon these input signals the phase differentiator 42 determines the phase differences $\phi_{14}$ and $\phi_{16}$. In place of the phase difference $\phi$, the phase differences $\phi_{14}$ and $\phi_{16}$ are applied to the controller 26 and output system 28. The reference signal produced by the VCO 46 is applied to the input system 24, the controller 26, and the output system 28 in place of the synchronized signal produced by the phase-locked loop 32. The controller then functions in accordance with equations (6) and (7) and the previous description.

The apparatus shown in FIG. 5 can be modified to support more than two repetitive vibration sources. For example, if there were a third repetitive vibration source, the DC voltage produced by the phase-locked loop associated with the third source would also be applied to the voltage divider, and the voltage divider would produce a voltage that is the average of the three DC voltages, which would be applied to the VCO 46. Also, the resistances of the voltage divider 44 could be chosen so that the reference signal produced by the VCO 46 has a frequency other than the average of the frequencies of the synchronized signals.

While the preferred embodiment of the invention has been illustrated and described, it will be appreciated that various changes, in addition to those previously mentioned herein, can be made therein without departing from the spirit and scope of the invention. For example, the step of forming the subset B shown in FIG. 4A could be eliminated and then all the frequency components of set S would be processed for each actuator as shown in FIG. 4B. Further, while the preferred embodiment of the invention has been described as an improvement to the prior art frequency-domain vibration controller disclosed in U.S. patent application Ser. No. 07/575,223, the improvements disclosed herein could be applied to other frequency-domain vibration controllers. Thus, the invention can be practiced otherwise than as specifically described therein.

The embodiments of the invention in which an exclusive property or privilege is claimed are defined as follows:

1. A method of reducing vibrations in a region or structure, the vibrations being produced by multiple sources of repetitive vibrations, said method comprising the steps of:
   (a) applying control vibrations at a plurality of first locations in a region or structure, said control vibrations created from sets of control-vibration frequency components so that each of said control vibrations is created from one of said sets of control-vibration frequency components, each of said control-vibration frequency components composed of source elements for cancelling vibrations produced by multiple sources of repetitive vibrations; and
   (b) cyclically updating said control vibrations by:
      (i) determining the phase difference between a reference signal and a source signal, said source signal being derived from a first source, said first source being one of said multiple sources of repetitive vibrations; and
      (ii) updating said sets of control-vibration frequency components based on said phase difference and said source elements.

2. The method claimed in claim 1, wherein said step of updating said sets of control-vibration frequency components comprises the substeps of:
   (a) weighting each of the source elements of each of the control-vibration frequency components with factors including said phase difference; and
   (b) calculating an updated amplitude and phase pair for each of said control-vibration frequency components by forming a sum including the weighted source elements corresponding to the control-vibration frequency component whose amplitude and phase pair is being updated.

3. The method claimed in claim 2, wherein said phase difference represents the time integral of the difference between the frequency of said reference signal and said source signal.

4. The method claimed in claim 3, wherein said step of applying control vibrations comprises the substeps of:
   (a) inverse-decomposing said sets of control-vibration frequency components to obtain control-vibration control signals; and
   (b) using said control-vibration control signals to create the control vibrations in said region or structure.

5. The method claimed in claim 4, wherein each of said sets of control-vibration frequency components contains frequency components corresponding to the fundamental frequency of said reference signal and harmonics thereof.

6. The method claimed in claim 5, wherein said control vibrations are applied synchronously with said reference signal.

7. The method claimed in claim 6, wherein said source signal forms a first source signal and including the step of determining the phase difference between said reference signal and a second source signal, said second source signal being derived from a second source, said second source being one of said multiple sources of repetitive vibrations, and wherein each of said control-vibration frequency components is composed of two source elements according to the following equation:

$$a_l(n)=Q_l(n)e^{jn\phi_1}+R_l(n)e^{jn\phi_2}$$

where:
   $a_l(n)$ is a complex number representing the amplitude and phase of a frequency component of the set of control-vibration frequency components of the control-vibration applied at a particular first location identified by the subscript, $_l$
   n is an integer equal to the harmonic number of said frequency component;
   $\phi_1$ is the phase difference between said first source signal and said reference signal and $\phi_2$ is the phase difference between said second source signal and said reference signal; and
   $Q_l(n)$ and $R_l(n)$ are complex numbers representing the source elements of said frequency component, wherein $Q_l(n)$ is the source element corresponding to said first source and $R_l(n)$ is the source element corresponding to said second source.

8. The method claimed in claim 7, wherein said source elements are periodically updated by:

(a) sensing vibrations at a plurality of second locations in said region or structure;

(b) determining representative values of said $\phi_1$ and $\phi_2$ phase differences based on the values of the $\phi_1$ and $\phi_2$ phase differences determined while said vibrations are being sensed at said plurality of second locations;

(c) decomposing said sensed vibrations into sets of sensed-vibration frequency components;

(d) calculating updates for the source elements of selected frequency components of said sets of control-vibration frequency components, said updates based on said sets of sensed-vibration frequency components and said representative values of said $\phi_1$ and $\phi_2$ phase differences; and (e) updating the source elements by updating the source elements of said selected frequency components of said sets of control-vibration frequency components based on said calculated updates.

9. The method claimed in claim 8, wherein said step of calculating updates for the source elements of selected frequency components of said sets of control-vibration frequency components comprises:

(a) transforming frequency components of said sets of sensed-vibration frequency components into updates for said selected frequency components of said sets of control-vibration frequency components; and (b) calculating source element updates based on said frequency component updates and said representative values of said $\phi_1$ and $\phi_2$ phase differences.

10. The method claimed in claim 9, wherein said source elements of the selected frequency components of said sets of control-vibration frequency components are updated by adding said source element updates to the present values of the corresponding source elements according to the following equations:

$$\Delta Q_l(n)+Q_l(n)\rightarrow Q_l(n)$$

$$\Delta R_l(n)+R_l(n)\rightarrow R_l(n)$$

where:

$Q_l(n)$ and $R_l(n)$ are the complex numbers representing the source elements of a frequency component of the set of control-vibration frequency components of the control-vibration applied at a particular first location identified by the subscript, $l$, wherein $Q_l(n)$ is the source element corresponding to said first source and $R_l(n)$ is the source element corresponding to said second source; and $\Delta Q_l(n)$ and $\Delta R_l(n)$ are complex numbers representing the updates for said source elements, wherein $\Delta Q_l(n)$ is the update for said source element $Q_l(n)$, and $\Delta R_l(n)$ is the update for said source element $R_l(n)$.

11. The method claimed in claim 10, wherein the source element updates are calculated by solving the following matrix equation in a weighted least-squares sense:

$$\begin{vmatrix} \gamma_1 & 0 \\ 0 & \gamma_2 \\ e^{jn\phi_1} & e^{jn\phi_2} \end{vmatrix} \begin{vmatrix} \Delta Q_l(n) \\ \Delta R_l(n) \end{vmatrix} = \begin{vmatrix} 0 \\ 0 \\ \Delta a_l(n) \end{vmatrix}$$

where:

$\gamma_1$ and $\gamma_2$ are scalars;

$\phi_1$ is said representative value of the phase difference between said first source signal and said reference signal;

$\phi_2$ is said representative value of the phase difference between said second source signal and said reference signal;

$\Delta a_l(n)$ is a complex number representing the amplitude and phase update for a frequency component of the set of control-vibration frequency components of the control vibration applied at a particular first location identified by the subscript, $l$;

n is an integer equal to the harmonic number of said frequency component; and $\Delta Q_l(n)$ and $\Delta R_l(n)$ are the updates for the source elements of said frequency component.

12. The method claimed in claim 11, wherein said second source signal forms said reference signal.

13. The method claimed in claim 11 or 12, wherein said step of decomposing said sensed vibrations comprises performing a Fast Fourier Transformation on each of said sensed vibrations.

14. The method claimed in claim 13, wherein said step of inverse-decomposing said sets of control-vibration frequency components comprises performing an inverse Fast Fourier Transformation on each of said sets of control-vibration frequency components.

15. The method claimed in claim 14, wherein the frequency components of each of said sets of sensed-vibration frequency components are the same as the frequency components of each of said sets of control-vibration frequency components.

16. The method claimed in claim 15, wherein said sensed vibrations are sensed synchronously with said reference signal.

17. The method claimed in claim 16, wherein said selected frequency components of said sets of control-vibration frequency components are selected by:

(a) determining the magnitude of the frequency components of said sets of sensed-vibration frequency components based on selected criteria; and (b) selecting those frequency components that have the greatest magnitude, the number of selected frequency components selected being less than the number of frequency components in said sets of control-vibration frequency components.

18. The method claimed in claim 1, wherein said source elements are periodically updated by:

(a) sensing vibrations at a plurality of second locations in said region or structure;

(b) determining a representative value of said phase difference between said reference signal and said source signal based on the values of said phase difference determined while said vibrations are being sensed at said plurality of second locations;

(c) decomposing said sensed vibrations into sets of sensed-vibration frequency components;

(d) calculating updates for the source elements of selected frequency components of said sets of control-vibration frequency components, said updates based on said sets of sensed-vibration frequency components and said representative value of said phase difference; and (e) updating the source elements by updating the source elements of said selected frequency components of said sets of control-vibration frequency components based on said calculated updates.

19. The method claimed in 18, wherein said step of calculating updates for the source elements of selected frequency components of said sets of control-vibration frequency components comprises:

(a) transforming frequency components of said sets of sensed-vibration frequency components into updates for said selected frequency components of said sets of control-vibration frequency components; and (b) calculating source element updates based on said frequency component updates and said representative value of said phase difference.

20. The method claimed in claim 19, wherein said source elements of the selected frequency components of said sets control-vibration frequency components are updated by summing said source element updates with the present values of the corresponding source elements.

21. The method claimed in claim 20, wherein said phase difference represents the time integral of the difference between the frequency of said reference signal and said source signal.

22. The method claimed in claim 21, wherein said source signal forms a first source signal and including the step of determining the phase difference between said reference signal and a second source signal, said second source signal being derived from a second source, said second source being one of said multiple sources of repetitive vibrations, and wherein each of said control-vibration frequency components is composed of two source elements, one for each of said first and second sources of repetitive vibrations.

23. The method claimed in claim 22, wherein said source element updates are calculated by solving the following matrix equation in a weighted least-squares sense:

$$\begin{vmatrix} \gamma_1 & 0 \\ 0 & \gamma_2 \\ e^{jn\phi_1} & e^{jn\phi_2} \end{vmatrix} \begin{vmatrix} \Delta Q_l(n) \\ \Delta R_l(n) \end{vmatrix} = \begin{vmatrix} 0 \\ 0 \\ \Delta a_l(n) \end{vmatrix}$$

where:

$\gamma_1$ and $\gamma_2$ are scalars;

$\phi_1$ is said representative value of the phase difference between said first source signal and said reference signal;

$\phi_2$ a representative value of the phase difference between said second source signal and said reference signal based on the values of the phase difference between said second source signal and said reference signal determined while said vibrations are being sensed at said plurality of second locations;

$\Delta a_l(n)$ is a complex number representing the amplitude and phase update of a frequency component of the set of control-vibration frequency components of the control vibration applied at a particular first location identified by the subscript, $l$;

n is an integer equal to the harmonic number of said frequency component; and $\Delta Q_l(n)$ and $\Delta R_l(n)$ are complex numbers representing the updates for the source elements of said frequency component, wherein $\Delta Q_l(n)$ is the update for the source element $Q_l(n)$ corresponding to said first source, and $\Delta R_l(n)$ is the update for the source element $R_l(n)$ corresponding to said second source.

24. The method claimed in claim 23, wherein said step updating said sets of control-vibration frequency components comprises the steps of:

(a) weighting each of the source elements of each of the control-vibration frequency components with factors including the corresponding phase differences; and (b) calculating an updated amplitude and phase pair for each of said control-vibration frequency components by forming a sum including the weighted source elements corresponding to the control-vibration frequency component whose amplitude and phase pair is being updated.

25. The method claimed in claim 24, wherein said step of applying control vibrations comprises the steps of:

(a) inverse-decomposing said sets of control-vibration frequency components to obtain control-vibration control signals; and (b) using said control-vibration control signals to create said control vibrations in said region or structure.

26. The method claimed in claim 25, wherein each of said sets of control-vibration frequency components contains frequency components corresponding to the fundamental frequency of said reference signal and harmonics thereof.

27. The method claimed in claim 26, wherein said control vibrations are applied synchronously with said reference signal.

28. An apparatus for reducing vibrations in a region or structure, the vibrations being produced by multiple sources of repetitive vibrations, said apparatus comprising:

(a) phase differentiator means for determining the phase difference between a reference signal and a source signal, said source signal based on a first source, said first source being one of multiple sources of repetitive vibrations that produce vibrations in a region or structure;

(b) a plurality of actuators for applying control vibrations at a plurality of first locations in said region or structure; and (c) output means coupled to said plurality of actuators and said phase differentiator means for:

(i) applying drive signals to said plurality of actuators, said drive signals created from sets of control-vibration frequency components so that each of said drive signals is created from one of said sets of control-vibration frequency components, each of said control-vibration frequency components composed of source elements for cancelling the vibrations produced by said multiple sources of repetitive vibrations; and (ii) cyclically updating said control vibrations by:

(1) receiving said phase difference determined by said phase differentiator means; and (2) updating said sets of control-vibration frequency components based on said phase difference and said source elements.

29. The apparatus claimed in claim 28, wherein said output means includes an inverse-decomposition means for producing control-vibration control signals by inverse-decomposing said sets of control-vibration frequency components, and wherein said output means synchronously creates said drive signals from said control-vibration control signals.

30. The apparatus claimed in claim 29, wherein said phase differentiator means includes:

(a) sensor means coupled to said first source for monitoring said first source and producing said source signal, the frequency of said source signal being based on the fundamental frequency of said first source;

(b) synchronized signal generating means coupled to said sensor means for:

(i) receiving said source signal produced by the sensor means; and (ii) producing a synchronized signal having a frequency that is a multiple of the frequency of said source signal and is synchronized therewith; and (c) a phase differentiator coupled to said synchronized signal generating means for:

(i) receiving said synchronized signal;

(ii) determining said phase difference between said reference signal and said source signal by analyzing the phase difference between said synchronized signal and said reference signal; and (iii) applying said phase difference determined by analysis to said output means.

31. The apparatus claimed in claim 30, wherein said updated sets of control-vibration frequency components are formed by:

(a) weighting each of the source elements of each of the control-vibration frequency components with factors including said phase difference between said reference signal and said source signal; and (b) calculating an updated amplitude and phase pair for each of said control-vibration frequency components by forming a sum including the weighted source elements corresponding to the control-vibration frequency component whose amplitude and phase pair is being updated.

32. The apparatus claimed in claim 31, wherein the phase difference determined by said phase differentiator represents the time integral of the difference between the frequency of said reference signal and the frequency of said source signal.

33. The apparatus claimed in claim 32, wherein each of said sets of control-vibration frequency components contains frequency components corresponding to the fundamental frequency of said reference signal and harmonics thereof.

34. The apparatus claimed in claim 33, wherein said drive signals are synchronized with said reference signal.

35. The apparatus claimed in claim 34, wherein said synchronized signal forms a first synchronized signal and said source signal forms a first source signal and wherein said sensor means includes means coupled to a second source, said second source being one of said multiple sources of repetitive vibrations, said means for monitoring said second source and producing a second source signal whose frequency is based on the fundamental frequency of said second source, and wherein said synchronized signal generating means includes means for receiving said second source signal and producing a second synchronized signal having a frequency that is a multiple of the frequency of said second source signal and is synchronized therewith, and wherein said phase differentiator receives said second synchronized signal and determines the phase difference between said second source signal and said reference signal by analyzing the phase difference between said second synchronized signal and said reference signal, and wherein each of said control-vibration frequency components is composed of two source elements according to the following equation:

$$a_l(n)=Q_l(n)e^{jn\phi_1}+R_l(n)e^{jn\phi_2}$$

where:

$a_l(n)$ is a complex number representing the amplitude and phase of a frequency component of the set of control-vibration frequency components of the control-vibration applied by a particular actuator identified by the subscript, $l$;

n is an integer equal to the harmonic number of said frequency component;

$\phi_1$ is the phase difference between said first source signal and said reference signal;

$\phi_2$ is the phase difference between said second source signal and said reference signal; and $Q_l(n)$ and $R_l(n)$ are complex numbers representing the source elements of said frequency component, $Q_l(n)$ is the source element corresponding to said first source and $R_l(n)$ is the source element corresponding to said second source.

36. The apparatus claimed in claim 35, further comprising:

(a) a plurality of sensors for sensing vibrations at a plurality of second locations in said region or structure;

(b) decomposition means coupled to said plurality of sensors for receiving and decomposing said sensed vibrations into sets of sensed-vibration frequency components; and (c) controller means coupled to said decomposition means, said phase differentiator, and said output means for:

(i) receiving said sets of sensed-vibration frequency components from said decomposition means;

(ii) receiving from said phase differentiator means representative values of said $\phi_1$ and $\phi_2$ phase differences determined while said sensors are sensing the vibrations that are decomposed by said decomposition means;

(iii) calculating updates for the sources elements of selected frequency components of said sets of control-vibration frequency components, said updates based on said sets of sensed-vibration frequency components and said representative values of said $\phi_1$ and $\phi_2$ phase differences;

(iv) updating the source elements by updating the source elements of said selected frequency components of said sets of control-vibration frequency components based on said calculated updates; and (v) supplying said updated source elements to said output means.

37. The apparatus claimed in claim 36, wherein said updates for the source elements of selected frequency components of said sets of control-vibration frequency components are calculated by:

(a) transforming frequency components of said sets of sensed-vibration frequency components into updates for said selected frequency components of said sets of control-vibration frequency components; and (b) calculating source element updates based on said frequency component updates and said representative values of said $\phi_1$ and $\phi_2$ phase differences.

38. The apparatus claimed in claim 37, wherein said source elements of the selected frequency components of said sets of control-vibration frequency components are updated by adding said source element updates to the present values of the corresponding source elements according to the following equations:

$$\Delta Q_l(n)+Q_l(n)\rightarrow Q_l(n)$$

$$\Delta R_l(n)+R_l(n)\rightarrow R_l(n)$$

where:

$Q_l(n)$ and $R_l(n)$ are the complex numbers representing the source elements of a frequency component of the set of control-vibration frequency components of the control-vibration applied by a particular actuator identified by the subscript $l$, wherein $Q_l(n)$ is the source element corresponding to said first source and $R_l(n)$ is the source element corresponding to said second source; and $\Delta Q_l(n)$ and $\Delta R_l(n)$ are complex numbers representing the updates for said source elements, wherein $\Delta Q_l(n)$ is the update for said source element $Q_l(n)$, and $\Delta R_l(n)$ is the update for said source element $R_l(n)$.

39. The apparatus claimed in claim 38, wherein the source element updates are calculated by solving the following matrix equation in a weighted least-squares sense:

$$\begin{vmatrix}\gamma_1 & 0\\ 0 & \gamma_2\\ e^{jn\phi_1} & e^{jn\phi_2}\end{vmatrix}\begin{vmatrix}\Delta Q_l(n)\\ \Delta R_l(n)\end{vmatrix}=\begin{vmatrix}0\\ 0\\ \Delta a_l(n)\end{vmatrix}$$

where:

$\gamma_1$ and $\gamma_2$ are scalars;

$\phi_1$ is the representative value of the phase difference between said first source signal and said reference signal;

$\phi_2$ is the representative value of the phase difference between said second source signal and said reference signal;

$\Delta a_l(n)$ is a complex number representing the amplitude and phase update for a frequency component of the set of control-vibration frequency components of the control vibration applied by a particular actuator identified by the subscript, $l$;

n is an integer equal to the harmonic number of said frequency component; and $\Delta Q_l(n)$ and $\Delta R_l(n)$ are the updates for the source elements of said frequency component.

40. The apparatus claimed in claim 39, wherein said second synchronized signal forms said reference signal.

41. The apparatus claimed in claim 39 or 40, wherein said decomposition means includes digital signal processor means programmed to perform Fast Fourier Transforms and said inverse-decomposition means includes digital signal processor means programmed to perform inverse Fast Fourier Transforms.

42. The apparatus claimed in claim 41, wherein the frequency components of each of said sets of sensed-vibration frequency components are the same as the frequency components of each of said sets of control-vibration frequency components.

43. The apparatus claimed in claim 42, wherein said selected frequency components of the sets of control-vibration frequency components are selected by:

(a) determining the magnitude of the frequency components of said sets of sensed-vibration frequency components based on selected criteria; and (b) selecting those frequency components that have the greatest magnitude, the number of frequency components selected being less than the number of frequency components in said sets of control-vibration frequency components.

44. The apparatus claimed in claim 28, further comprising:

(a) a plurality of sensors for sensing vibrations at a plurality of second locations in said region or structure;

(b) decomposition means coupled to said plurality of sensors for receiving and decomposing said sensed vibrations into sets of sensed-vibration frequency components; and (c) controller means coupled to said decomposition means, said phase differentiator means, and said output means for:

(i) receiving said sets of sensed-vibration frequency components from said decomposition means;

(ii) receiving from said phase differentiator means a representative value of said phase difference between said reference signal and said source signal based on the values of the phase difference between said reference signal and said source signal while said sensors are sensing the vibrations that are decomposed by said decomposition means;

(iii) calculating updates for the source elements of selected frequency components of said sets of control-vibration frequency components, said updates based on said sets of sensed-vibration frequency components and said representative value of said phase difference;

(iv) updating the source elements by updating the source elements of said selected frequency components of said sets of control-vibration frequency components based on said calculated updates; and (v) supplying said updated source elements to said output means.

45. The apparatus claimed in claim 44, wherein said updates for the source elements of selected frequency components of said sets of control-vibration frequency components are calculated by:

(a) transforming frequency components of said sets of sensed-vibration frequency components into updates for said selected frequency components of said sets of control-vibration frequency components; and (b) calculating source element updates based on said frequency component updates and said representative value of said phase difference.

46. The apparatus claimed in claim 45, wherein said source elements of the selected frequency components of said sets of control-vibration frequency components are updated by summing said source element updates with the present values of the corresponding source elements.

47. The apparatus claimed in claim 46, wherein said phase difference represents the time integral of the difference between the frequency of said reference signal and the frequency of said source signal.

48. The apparatus claimed in claim 47, wherein said source signal forms a first source signal and wherein said phase differentiator means determines the phase difference between said reference signal and a second source signal, said second source signal based on a second one of said multiple sources of repetitive vibrations, further wherein said control-vibrations frequency components are composed of two source elements, one for each of said first and second source of repetitive vibrations.

49. The apparatus claimed in claim 48, wherein said source element updates are calculated by solving the following matrix equation in a weighted least-squares sense:

$$\begin{vmatrix} \gamma_1 & 0 \\ 0 & \gamma_2 \\ e^{jn\phi_1} & e^{jn\phi_2} \end{vmatrix} \begin{vmatrix} \Delta Q_l(n) \\ \Delta R_l(n) \end{vmatrix} = \begin{vmatrix} 0 \\ 0 \\ \Delta a_l(n) \end{vmatrix}$$

where:

$\gamma_1$ and $\gamma_2$ are scalars;

$\phi_1$ is said representative value of the phase difference between said first source signal and said reference signal;

$\phi_2$ is a representative value of the phase difference between said second source signal and said reference signal, said $\phi_2$ representative value based on the values of the phase difference between said second source signal and said reference signal while said sensors are sensing the vibrations that are decomposed by said decomposition means;

$\Delta a_l(n)$ is a complex number representing the amplitude and phase update of a frequency component of the set of control-vibration frequency components of the control vibration applied by a particular actuator identified by the subscript, $l$;

n is an integer equal to the harmonic number of said frequency component; and $\Delta Q_l(n)$ and $\Delta R_l(n)$ are complex numbers representing the updates for the source elements of said frequency component, wherein $\Delta Q_l(n)$ is the update for the source element corresponding to said first source, and $\Delta R_l(n)$ is the update for the source element corresponding to said second source.

50. The apparatus claimed in claim 49, wherein said output means includes an inverse-decomposition means for producing control-vibration control signals by inverse-decomposing said sets of control-vibration frequency components, and wherein said output means synchronously creates said drive signals from said control-vibration control signals.

51. The apparatus claimed in claim 50, wherein said phase differentiator means includes:

(a) sensor means coupled to said first and second sources of repetitive vibrations for monitoring said first and second sources and producing said first and second source signals each of whose frequency is based on the fundamental frequency generated by the related source;

(b) synchronized signal generating means coupled to said sensor means for producing synchronized signals, said synchronized signal generating means:

(i) receiving the first and second source signals produced by the sensor means; and (ii) producing for said first and second source signals, related first and second synchronized signals each having a frequency that is a multiple of the frequency of the related source signal and is synchronized therewith; and (c) a phase differentiator coupled to said synchronized signal generating means for:

(i) receiving said first and second synchronized signals;

(ii) determining said phase differences between said reference signal and said first and second source signals by analyzing the phase differences between said reference signal and said first and second synchronized signals; and (iii) applying said phase differences determined by analysis to said output means and said controller means.

52. The apparatus claimed in claim 51, wherein said updated sets of control-vibration frequency components are formed by:

(a) weighting each of the source elements of each of the control-vibration frequency components with factors including the corresponding phase differences between said reference signal and said first and second source signals; and (b) calculating an updated amplitude and phase pair for each of said control-vibration frequency components by forming a sum including the weighted source elements corresponding to the control-vibration frequency component whose amplitude and phase is being updated.

53. The apparatus claimed in claim 52, wherein each of said sets of control-vibration frequency components contains frequency components corresponding to the fundamental frequency of said reference signal and harmonics thereof.

54. The apparatus claimed in claim 53, wherein said drive signals are synchronized with said reference signal.

* * * * *

UNITED STATES PATENT AND TRADEMARK OFFICE

CERTIFICATE OF CORRECTION

PATENT NO. : 5,245,552

DATED : September 14, 1993

INVENTOR(S) : A. O. Andersson et al.

It is certified that error appears in the above-indentified patent and that said Letters Patent is hereby corrected as shown below:

| COLUMN | LINE | |
|---|---|---|
| 7 | 3 & 4 | "reduces" should read --reduce-- |
| 9 | 17 | "FET" should read --FFT-- |
| 9 | 18 | "FET" should read --FFT-- |
| 9 | 32 | "FETs" should read --FFTs-- |
| 12 | 2 | "]th" should read --nth-- |
| 12 | 6 | "FET" should read --FFT-- |

Signed and Sealed this

Twenty-second Day of March, 1994

Attest:

BRUCE LEHMAN

*Attesting Officer*

*Commissioner of Patents and Trademarks*